United States Patent
Megarity et al.

(10) Patent No.: US 10,528,461 B2
(45) Date of Patent: Jan. 7, 2020

(54) CONTROLLING WEAR AMONG FLASH MEMORY DEVICES BASED ON REMAINING WARRANTY

(71) Applicant: Lenovo Enterprise Solutions (Singapore) Pte. Ltd., Singapore (SG)

(72) Inventors: William M. Megarity, Raleigh, NC (US); Emil P. Parker, Youngsville, NC (US); Luke D. Remis, Raleigh, NC (US); Christopher L. Wood, Greenville, NC (US)

(73) Assignee: Lenovo Enterprise Solutions (Singapore) Pte. Ltd. (SG)

( * ) Notice: Subject to any disclaimer, the term of this patent is extended or adjusted under 35 U.S.C. 154(b) by 1021 days.

(21) Appl. No.: 14/450,437

(22) Filed: Aug. 4, 2014

(65) Prior Publication Data
US 2016/0034386 A1    Feb. 4, 2016

(51) Int. Cl.
G06F 12/02    (2006.01)

(52) U.S. Cl.
CPC .. *G06F 12/0246* (2013.01); *G06F 2212/1036* (2013.01); *G06F 2212/2022* (2013.01);
(Continued)

(58) Field of Classification Search
None
See application file for complete search history.

(56) References Cited

U.S. PATENT DOCUMENTS

| | | |
|---|---|---|
| 6,000,006 A | 12/1999 | Bruce et al. |
| 6,230,233 B1 | 5/2001 | Lofgren et al. |

(Continued)

FOREIGN PATENT DOCUMENTS

| | | |
|---|---|---|
| CN | 103176752 A | 6/2013 |
| WO | WO2011010348 | 7/2009 |
| WO | WO2011153124 | 12/2011 |

OTHER PUBLICATIONS

Feng, Shuguang, et al., "Maestro: Orchestrating lifetime reliability in chip multiprocessors." High Performance Embedded Architectures and Compilers. Springer Berlin Heidelberg, 2010. 10 pages.
(Continued)

*Primary Examiner* — Ann J Lo
*Assistant Examiner* — Leandro R Villanueva
(74) *Attorney, Agent, or Firm* — Jeffrey L. Streets

(57) ABSTRACT

A computer readable storage medium embodies program instructions executable by a processor to perform a method including identifying a product warranty for each of a plurality of flash memory devices within a system, wherein the product warranty includes a maximum number of writes and a maximum age, and tracking the number of writes and the age of each flash memory device. The method further includes determining, for each flash memory device, a number of pro rata writes remaining in the product warranty, which is determined as a number of writes remaining until the flash memory device reaches the maximum number of writes divided by an amount of time remaining until the flash memory reaches the maximum age. The method then causes data to be written to the flash memory device having the greatest number of pro rata writes remaining in the product warranty.

18 Claims, 3 Drawing Sheets

(52) U.S. Cl.
CPC ............... *G06F 2212/7204* (2013.01); *G06F 2212/7211* (2013.01)

(56) References Cited

U.S. PATENT DOCUMENTS

| | | | |
|---|---|---|---|
| 7,139,863 B1 | 11/2006 | Defouw et al. | |
| 7,657,701 B2 | 2/2010 | Shanmuganathan | |
| 7,925,822 B2 | 4/2011 | Mosek | |
| 8,356,153 B2 | 1/2013 | Franceschini et al. | |
| 8,539,139 B1 | 9/2013 | Morris | |
| 2005/0204187 A1 | 9/2005 | Lee et al. | |
| 2006/0155917 A1* | 7/2006 | Di Sena | G06F 12/0246 711/103 |
| 2007/0208904 A1* | 9/2007 | Hsieh | G06F 12/0246 711/103 |
| 2008/0140918 A1* | 6/2008 | Sutardja | G06F 12/0246 711/103 |
| 2009/0138654 A1* | 5/2009 | Sutardja | G06F 12/0246 711/103 |
| 2010/0174851 A1* | 7/2010 | Leibowitz | G06F 3/0616 711/103 |
| 2010/0325340 A1* | 12/2010 | Feldman | G06F 12/0246 711/103 |
| 2011/0145473 A1* | 6/2011 | Maheshwari | G06F 12/0866 711/103 |
| 2012/0124273 A1 | 5/2012 | Goss et al. | |
| 2012/0284587 A1 | 11/2012 | Yu et al. | |
| 2012/0317337 A1 | 12/2012 | Johar et al. | |
| 2013/0007380 A1 | 1/2013 | Seekins | |
| 2013/0013886 A1 | 1/2013 | Franceschini | |
| 2013/0185487 A1 | 7/2013 | Kim et al. | |
| 2013/0275835 A1 | 10/2013 | Aswadhati | |
| 2014/0208004 A1* | 7/2014 | Cohen | G06F 12/0246 711/103 |
| 2014/0215129 A1* | 7/2014 | Kuzmin | G06F 12/0246 711/103 |
| 2015/0113207 A1* | 4/2015 | Shin | G06F 12/0246 711/103 |
| 2016/0034387 A1* | 2/2016 | Megarity | G06F 12/0246 711/103 |

OTHER PUBLICATIONS

Soraya, "A Reliability Enhancing Mechanism for a Large Flash Embedded Satellite Storage System", PRiSM laboratory—University of Versailles, IN University of Versailles, 78000 Versailles, France, 2008. (This document only identifies the year of publication (without the month), but the year of publication is sufficiently earlier than the effective U.S. filing date and any foreign priority date so that the particular month of publication is not in issue. See MPEP 609.04(a)).

Yuan-Hao Chang et al., "Improving Flash Wear-Leveling by Proactively Moving Static Data", IEEE Transactions on Computers, vol. 59, No. 1, Jan. 2010.

* cited by examiner

| Flash Memory Device (40) | Warranty | | Actual Use | | Pro Rata Writes Remaining (#/day) (52) | Rank (54) |
|---|---|---|---|---|---|---|
| | Max.Writes (24) | Max. Age (days) (26) | Writes (30) | Age (32) | | |
| 1 | 1,000,000 | 750 | 657,512 | 621 | 2,655 | 2 |
| 2 | 800,000 | 750 | 512,463 | 562 | 1,529 | 3 |
| 3 | 1,000,000 | 365 | 723,596 | 295 | 3,949 | 1 |
| 4 | 750,000 | 365 | 698,421 | 325 | 1,289 | 4 |

| Flash Memory Device (40) | Warranty | | Actual Use | | Days Remaining Under Warranty (62) | Rank (64) |
|---|---|---|---|---|---|---|
| | Max.Writes (24) | Max. Age (days) (26) | Writes (30) | Age (32) | | |
| 1 | 1,000,000 | 750 | 657,512 | 621 | 129 | 3 |
| 2 | 800,000 | 750 | 512,463 | 562 | 188 | 4 |
| 3 | 1,000,000 | 365 | 723,596 | 295 | 70 | 2 |
| 4 | 750,000 | 365 | 698,421 | 325 | 40 | 1 |

CONTROLLING WEAR AMONG FLASH MEMORY DEVICES BASED ON REMAINING WARRANTY

BACKGROUND

Field of the Invention

The present invention relates to methods of distributing the writing of data among a plurality of flash memory devices.

Background of the Related Art

Flash memory is a form of non-volatile computer readable storage medium that is used for high-speed and high-density data storage solutions. However, flash memory cells within a flash memory device experience wear over a large number of write cycles. Many manufactures of flash memory will rate their flash memory devices at a given number of write cycles or similar usage parameter.

Flash memory devices typically include a local controller for handling read and write operations to the flash memory. The local controller may use a wear leveling algorithm to distribute writes across all of the memory cell blocks within the flash memory device. Such wear leveling assures that the memory cell blocks wear at about the same rate, rather than over-utilizing some memory cell blocks and under-utilizing other memory cell blocks.

BRIEF SUMMARY

One embodiment of the present invention provides a computer readable storage medium having program instructions embodied therewith, the program instructions executable by a processor to cause the processor to perform a method. The method comprises identifying a product warranty for each of a plurality of flash memory devices within a system, wherein the product warranty includes a maximum number of writes and a maximum age, and tracking the number of writes made to each flash memory device and the age of each flash memory device. The method further comprises determining, for each flash memory device, a number of pro rata writes remaining in the product warranty, wherein the number of pro rata writes remaining in the product warranty is determined as a number of writes remaining until the flash memory device reaches the maximum number of writes identified in the product warranty divided by an amount of time remaining until the flash memory reaches the maximum age identified in the product warranty. The method then causes data to be written to the flash memory device having the greatest number of pro rata writes remaining in the product warranty.

BRIEF DESCRIPTION OF THE SEVERAL VIEWS OF THE DRAWINGS

FIG. 2 is a hypothetical table that might be maintained by a controller that determines the pro rata writes remaining under the warranty for each flash memory device within a system.

FIG. 3 is a hypothetical table that might be maintained by a controller that determines the flash memory device having the least number of remaining days under warranty.

DETAILED DESCRIPTION

Figure 1:
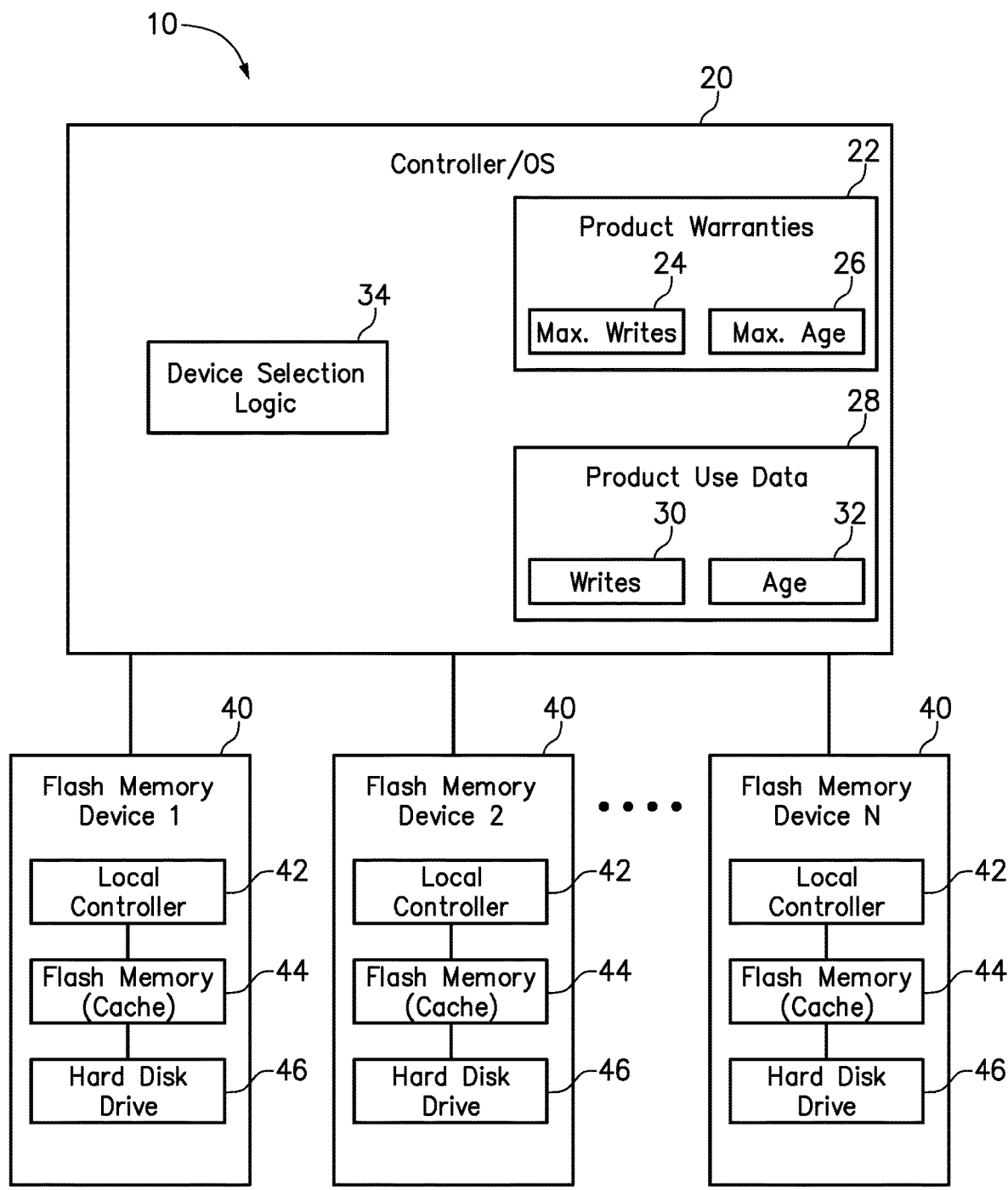
FIG. 1 is a diagram of a system including a controller that manages the distribution of writes to a plurality of flash memory devices.

One embodiment of the present invention provides a method, comprising identifying a product warranty for each of a plurality of flash memory devices within a system, wherein the product warranty includes a maximum number of writes and a maximum age, and tracking the number of writes made to each flash memory device and the age of each flash memory device. The method further comprises determining, for each flash memory device, a number of pro rata writes remaining in the product warranty, wherein the number of pro rata writes remaining in the product warranty is determined as a number of writes remaining until the flash memory device reaches the maximum number of writes identified in the product warranty divided by an amount of time remaining until the flash memory reaches the product age identified in the product warranty. The method then causes data to be written to the flash memory device having the greatest number of pro rata writes remaining in the product warranty.

The step of determining a number of pro rata writes remaining in the product warranty for each flash memory device may, for example, be performed by an operating system of a computer in communication with the plurality of flash memory devices, by a controller coupled to the plurality of flash memory devices, or some combination of devices.

The product warranty may be obtained as a data file stored on the individual flash memory device or downloaded from an online source of product warranty information. Alternatively, a user may manually enter the product warranty into a graphical user interface to the controller or operating system that performs the method.

Tracking of the number of writes made to each flash memory device and the age of each flash memory device may be performed by the controller or operating system that executes the method. Alternatively, the tracking may be performed by the individual flash memory device, where the controller or operating system subsequently obtains an update of the tracking data from each of the flash memory devices.

In one optional aspect of the invention, the method may further comprise identifying one of the flash memory devices having the least amount of time remaining until the flash memory reaches the product age identified in the product warranty, and increasing a rate of writing data to the identified flash memory device so that the number of writes made to the identified flash memory device reaches the maximum number of writes identified in the product warranty at approximately the same time as the age of the identified flash memory device reaches the maximum age identified in the product warranty. Accordingly, additional writes are focused toward those flash memory devices that are about to go off warranty due to age so that the warrantied number of write may be executed before, or simultaneous with, the flash memory device reaching the maximum age identified in the warranty.

The flash memory devices may take various forms or configurations, and a system may include one or more of these forms or configurations of devices. Non-limiting examples of the flash memory devices include solid state drives, serial bus attached data storage devices, flash memory module cards, universal serial bus (USB) flash drives, and cache memory for a hard disk drive. Optionally, the plurality of flash memory devices may form a single logical memory device.

Still further, the method may further comprise wear leveling data stored on each flash memory device. This wear leveling is performed by a local controller that is part of the individual flash memory device and works to provide an approximately equal number of writes across the entire flash memory. Accordingly, the wear leveling addresses the longevity of the individual flash memory devices, whereas the efficient use of the product warranty for each flash memory device is addressed by causing data to be written to the flash memory device having the greatest number of pro rata writes remaining in the product warranty.

One embodiment of the present invention provides a computer readable storage medium having program instructions embodied therewith, the program instructions executable by a processor to cause the processor to perform a method. The method comprises identifying a product warranty for each of a plurality of flash memory devices within a system, wherein the product warranty includes a maximum number of writes and a maximum age, and tracking the number of writes made to each flash memory device and the age of each flash memory device. The method further comprises determining, for each flash memory device, a number of pro rata writes remaining in the product warranty, wherein the number of pro rata writes remaining in the product warranty is determined as a number of writes remaining until the flash memory device reaches the maximum number of writes identified in the product warranty divided by an amount of time remaining until the flash memory reaches the product age identified in the product warranty. The method then causes data to be written to the flash memory device having the greatest number of pro rata writes remaining in the product warranty.

The foregoing computer readable storage medium may embody further program instructions for implementing or initiating any one or more aspects of the methods described herein. Accordingly, a separate description of the methods will not be duplicated in the context of a computer readable storage medium.

FIG. 1 is a diagram of a system 10 including a controller 20 that manages the distribution of data writes to a plurality of flash memory devices 40. The controller 20 obtains or determines the product warranties 22 for each of the flash memory devices 40, where each product warranty includes the maximum number of writes 24 and the maximum age 26 covered by the product warranty. The controller 20 also obtains or determines product use data 28 for each of the flash memory devices 40, where the product use data identifies the actual number of writes 30 performed on the device and the actual age 32 of the device. Device control logic 34 executed by the controller 20 may then use the product warranties 22 and the product use data 28 in order to dynamically prioritize the writing of data to the flash memory devices 40. For example, flash memory devices 40 that are nearing the end of an age-based warranty, but having high number of writes remaining under warranty, may be given a higher priority while other flash memory devices 40 having a longer period before reaching the end of the age-based warranty may be given a lower priority. In a further option, the write rate for each device would be dynamically adjusted to ensure both warranties exhaust simultaneously.

Each of plurality of flash memory devices 40 may be different types and sizes, but are shown as each including a local controller 42 and flash memory 44 forming a caching layer for a hard disk drive 46. With or without the hard disk drive 46, the local controller 42 may perform wear level on the flash memory 44.

As shown, the flash memory 44 is used as a caching layer in order to provide faster write access than a spinning platter of the hard disk drive 46, while also be non-volatile so that data is not lost whenever there is a loss of power. Furthermore, the system 10 may form a single logical unit that receives and executed writes as a single data storage unit.

FIG. 2 is a hypothetical table 50 that might be maintained by the controller 20 for determining the pro rata writes remaining under the product warranty for each flash memory device 40 within the system 10. The table 50 includes data for each of the flash memory devices 40, illustrated here as one row of data for each of the Flash Memory Devices 1-4. For each of the flash memory devices, the table 50 identifies the maximum writes 24 and the maximum age (days) 26 identified in the product warranties 22, as well as the actual number of writes 30 and age 32 identified in the product use data 28. Accordingly, the device selection logic 34 may determine the pro rata writes 52 (number of writes per day) remaining under the warranty. The pro rata writes may be determined using the equation: Pro Rata Writes=(Max. Writes−Writes)/(Max. Age−Age). As shown, the controller has identified Flash Memory Device 3 as have the highest rank 54 or priority for receiving writes, since Flash Memory Device 3 needs 3,949 writes/day in order for the writes under warranty to become exhausted by the time the device reaches its maximum age under warranty. As possible, the controller should send more writes to Flash Memory Device 3 than the other devices. Preferably, the controller may send writes to the Flash Memory Devices 1-4 in proportion to their pro rate writes remaining.

FIG. 3 is a hypothetical table 60 that might be maintained by the controller for determining the flash memory device having the least number of remaining days under warranty. The first five columns of table 60 are the same as the first five columns of table 50 in FIG. 2. However, the number of days remaining under warranty 62 has been determined by subtracting the age 32 of the device from the maximum age 26 identified in the product warranty 22 for that device. Then, a rank 64 identifies that Flash Memory Device 4 has the least number of days remaining in the warranty. The method may optionally adjust the number of writes to Flash Memory Device 4 over the final 40 days until its warranty expires in order to use all or most of the remaining writes by the time the device reaches the maximum age identified in the warranty. Accordingly, despite Flash Memory Device 3 have the highest pro rata writes remaining 52 (FIG. 2), the controller should prioritize sending an average of 1,289 writes per day to Flash Memory Device 4 in order to maximize the efficient use of the warranty.

Figure 4:
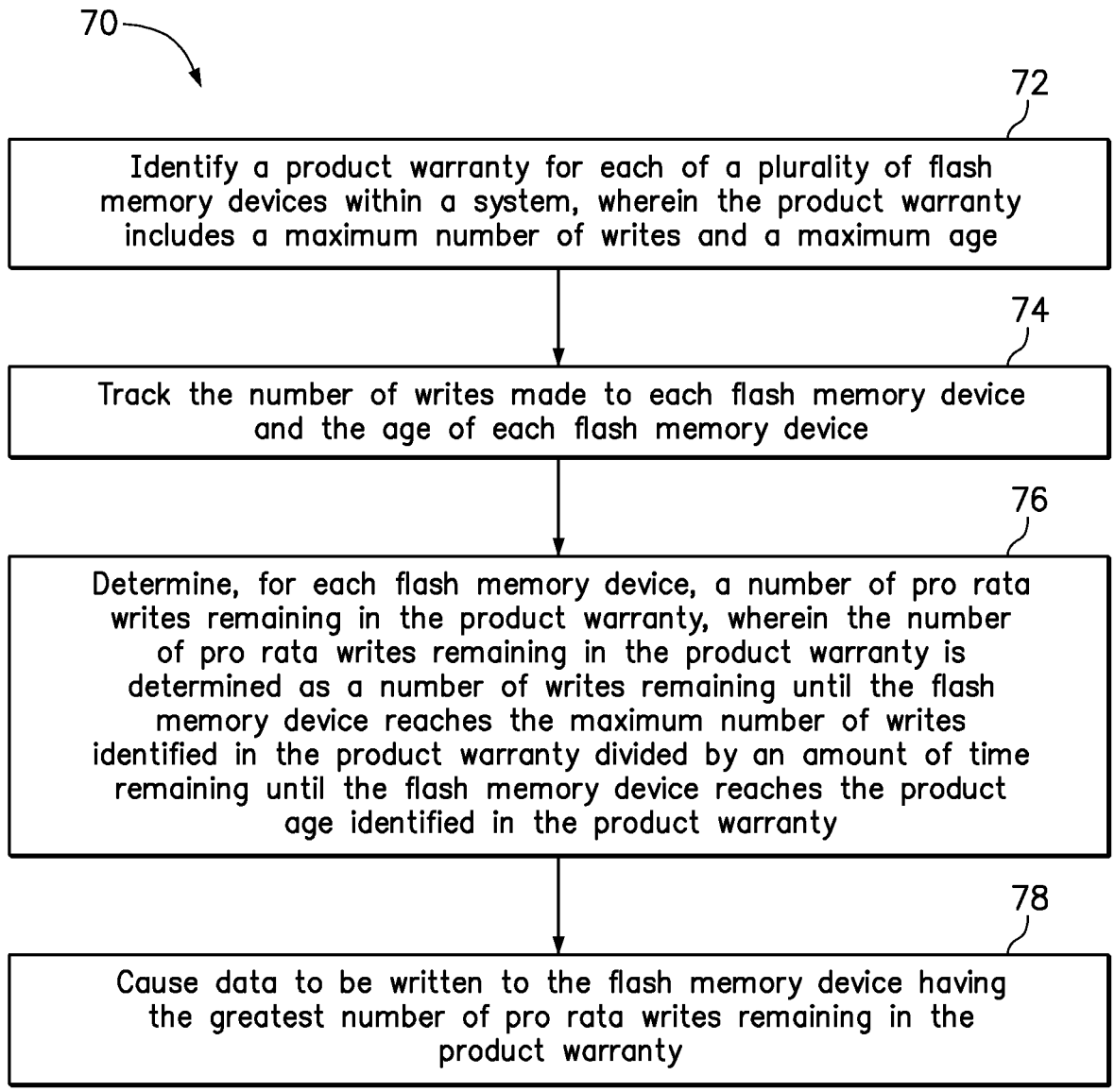
FIG. 4 is a flowchart of a method in accordance with one embodiment of the present invention.

FIG. 4 is a flowchart of a method 70 in accordance with one embodiment of the present invention. In step 72, a product warranty is identified for each of a plurality of flash memory devices within a system, wherein the product warranty includes a maximum number of writes and a maximum age. Step 74 tracks the number of writes made to each flash memory device and the age of each flash memory device. Step 76 then determines, for each flash memory device, a number of pro rata writes remaining in the product warranty, wherein the number of pro rata writes remaining in the product warranty is determined as a number of writes remaining until the flash memory device reaches the maximum number of writes identified in the product warranty divided by an amount of time remaining until the flash memory reaches the product age identified in the product warranty. In step 78, the method causes data to be written to the flash memory device having the greatest number of pro rata writes remaining in the product warranty.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer readable storage medium having program instructions embodied therewith, the program instructions executable by a processor to cause the processor to perform a method comprising:
   identifying a product warranty for each of a plurality of flash memory devices within a system, wherein the product warranty includes a maximum number of writes and a maximum age that is covered by the product warranty;
   tracking the number of writes made to each flash memory device and the age of each flash memory device;
   determining, for each flash memory device, a number of pro rata writes remaining in the product warranty, wherein the number of pro rata writes remaining in the product warranty is determined as a number of writes remaining until the flash memory device reaches the maximum number of writes identified in the product warranty divided by an amount of time remaining until the flash memory reaches the maximum age identified in the product warranty; and
   prioritizing the writing of data to the flash memory device having the greatest number of pro rata writes remaining in the product warranty relative to others of the flash memory devices.

2. The computer program product of claim 1, the method further comprising:
   identifying one of the flash memory devices having the least amount of time remaining until the flash memory reaches the product age identified in the product warranty; and
   increasing a rate of writing data to the identified flash memory device so that the number of writes made to the identified flash memory device reaches the maximum number of writes identified in the product warranty at approximately the same time as the age of the identified flash memory device reaches the maximum age identified in the product warranty.

3. The computer program product of claim 1, wherein the flash memory is a component of a device selected from a solid state drive, a serial bus attached data storage device, and a flash memory module card.

4. The computer program product of claim 1, wherein the plurality of flash memory devices form a single logical memory device.

5. The computer program product of claim 1, wherein the plurality of flash memory devices are cache memory for a plurality of hard disk drives.

6. The computer program product of claim 1, wherein the step of determining, for each flash memory device, a number of pro rata writes remaining in the product warranty is performed by an operating system of a computer in communication with the plurality of flash memory devices.

7. The computer program product of claim 1, wherein the step of determining, for each flash memory device, a number of pro rata writes remaining in the product warranty is performed by a controller coupled to the plurality of flash memory devices.

8. The computer program product of claim 1, the method further comprising:
   wear leveling data that is being stored on each flash memory device.

9. The computer program product of claim 8, wherein wear leveling data that is being stored on each flash memory device is performed by a controller within each flash memory device.

10. A method, comprising:
    identifying a product warranty for each of a plurality of flash memory devices within a system, wherein the product warranty includes a maximum number of writes and a maximum age that is covered by the product warranty;
    tracking the number of writes made to each flash memory device and the age of each flash memory device;
    determining, for each flash memory device, a number of pro rata writes remaining in the product warranty, wherein the number of pro rata writes remaining in the product warranty is determined as a number of writes remaining until the flash memory device reaches the maximum number of writes identified in the product warranty divided by an amount of time remaining until the flash memory reaches the maximum age identified in the product warranty; and
    prioritizing the writing of data to the flash memory device having the greatest number of pro rata writes remaining in the product warranty relative to others of the flash memory devices.

11. The method of claim 10, further comprising:
    identifying one of the flash memory devices having the least amount of time remaining until the flash memory reaches the product age identified in the product warranty; and
    increasing a rate of writing data to the identified flash memory device so that the number of writes made to the identified flash memory device reaches the maximum number of writes identified in the product warranty at approximately the same time as the age of the identified flash memory device reaches the maximum age identified in the product warranty.

12. The method of claim 10, wherein the flash memory is a component of a device selected from a solid state drive, a serial bus attached data storage device, and a flash memory module card.

13. The method of claim 10, wherein the plurality of flash memory devices form a single logical memory device.

14. The method of claim 10, wherein the plurality of flash memory devices are cache memory for a plurality of hard disk drives.

15. The method of claim 10, wherein the step of determining, for each flash memory device, a number of pro rata writes remaining in the product warranty is performed by an operating system of a computer in communication with the plurality of flash memory devices.

16. The method of claim 10, wherein the step of determining, for each flash memory device, a number of pro rata writes remaining in the product warranty is performed by an controller coupled to the plurality of flash memory devices.

17. The method of claim 10, further comprising:
   wear leveling data that is being stored on each flash memory device.

18. The method of claim 17, wherein wear leveling data that is being stored on each flash memory device is performed by a controller within each flash memory device.

* * * * *